United States Patent [19]

Beall et al.

[11] Patent Number: 4,467,039
[45] Date of Patent: Aug. 21, 1984

[54] POTASSIUM FLUORRICHTERITE GLASS CERAMICS AND METHOD

[75] Inventors: George H. Beall, Big Flats; John E. Megles, Jr., Corning, both of N.Y.

[73] Assignee: Corning Glass Works, Corning, N.Y.

[21] Appl. No.: 492,953

[22] Filed: May 9, 1983

[51] Int. Cl.³ ............................ C03C 3/22; C03C 3/04
[52] U.S. Cl. ............................................. 501/3; 501/57
[58] Field of Search ........................................ 501/3, 57

[56] References Cited

U.S. PATENT DOCUMENTS

| | | | |
|---|---|---|---|
| 2,948,629 | 8/1960 | Shell | 501/151 |
| 3,201,266 | 8/1965 | MacDowell | 501/6 |
| 3,384,508 | 5/1968 | Bopp et al. | 501/6 |
| 3,516,810 | 6/1970 | Ivey et al. | 501/151 |
| 3,720,526 | 3/1973 | Duke et al. | 501/6 |
| 3,839,056 | 10/1974 | Grossman | 501/3 |
| 3,905,824 | 9/1975 | Grossman | 501/3 |
| 4,341,872 | 7/1982 | MacDowell | 501/6 |
| 4,386,162 | 5/1983 | Beall | 501/3 |

FOREIGN PATENT DOCUMENTS 247589  9/1962  Australia .................................. 501/3

Primary Examiner—Mark Bell
Attorney, Agent, or Firm—C. S. Janes, Jr.

[57] ABSTRACT

There is disclosed a highly crystalline glass-ceramic article exhibiting superior toughness against fracture propagation, a modulus of rupture in excess of 20,000 psi, a predominant crystal phase of potassium fluorrichterite, and having an overall composition consisting essentially of $SiO_2$: 50–70
CaO: 4–15
MgO: 8–25
F: 3–8
$Na_2O$: 2–9
$K_2O$: 2–12
$Li_2O$: 0–3
$Al_2O_3$: 0–7

Canasite may be a secondary phase, but a crystal phase composed essentially of potassium fluorrichterite is preferred for dinnerware.

7 Claims, 1 Drawing Figure

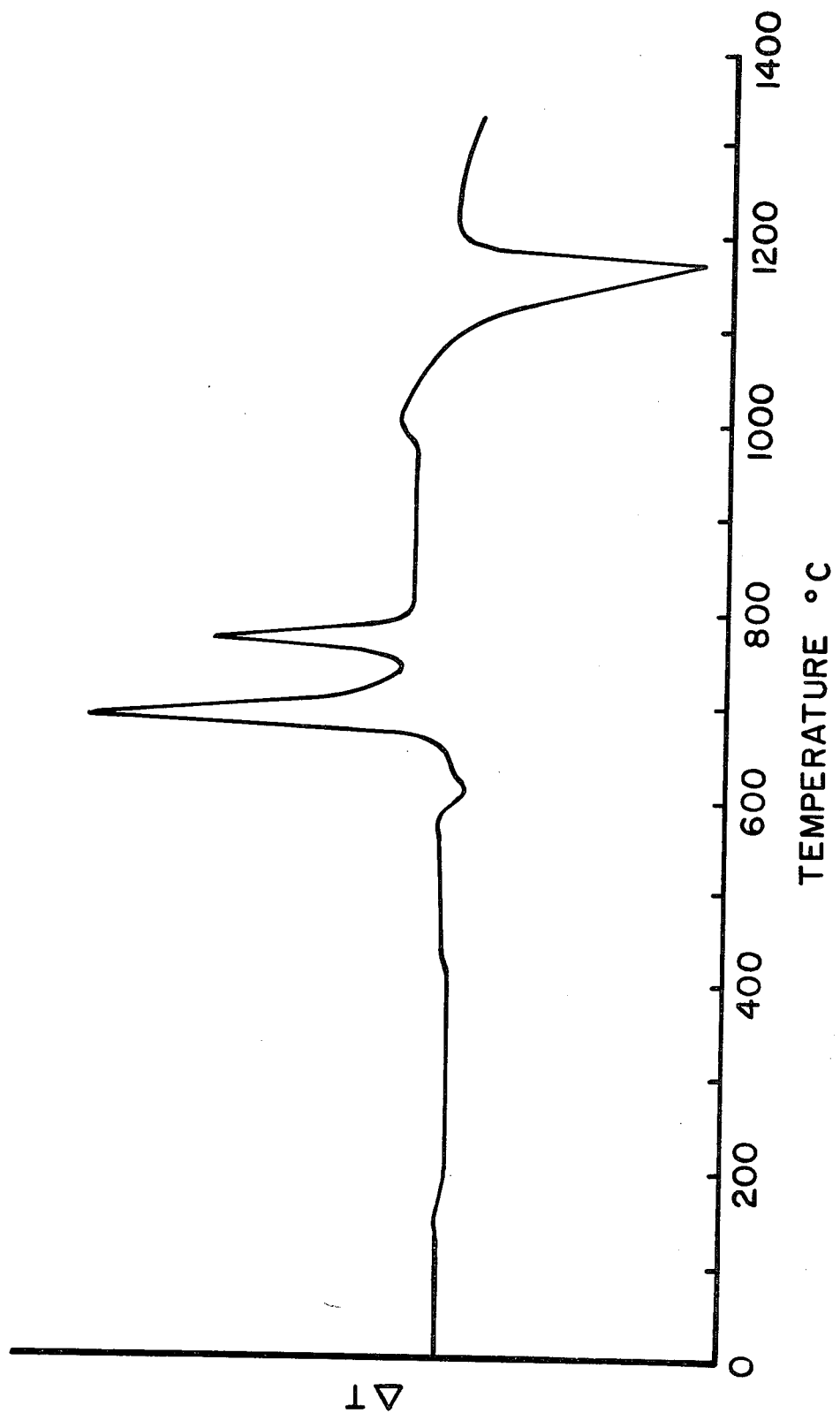

POTASSIUM FLUORRICHTERITE GLASS CERAMICS AND METHOD

BACKGROUND OF THE INVENTION

Glass-ceramic articles, i.e., articles prepared by subjecting glass articles to a controlled heat treatment to effect crystallization in situ, are well known to the art. The method for producing such articles customarily involves three fundamental steps: first, a glass-forming batch is melted; second, the melt is simultaneously cooled to a temperature at least below the transformation range thereof and a glass body of a desired geometry shaped therefrom; and, third, the glass body is heated to temperatures above the transformation range of the glass in a controlled manner to generate crystals in situ, this heat treatment frequently being termed "ceramming".

Frequently, the glass body is exposed to a two-stage heat treatment. In this treatment, the glass will be heated initially to a temperature within, or somewhat above, the transformation range for a period of time sufficient to cause the development of nuclei in the glass. Thereafter, the temperature will be raised to levels approaching, or even exceeding, the softening point of the glass to cause the growth of crystals on the previously-formed nuclei. The resultant crystals are commonly more uniformly fine-grained, and the articles are typically more highly crystalline.

Because glass-ceramic articles are generally highly crystalline, viz., greater than 50% by volume crystalline, they are normally mechanically stronger than the precursor glass articles from which they were derived. Hence, annealed glass bodies conventionally demonstrate modulus of rupture values in the range of about 5,000–10,000 psi, whereas the glass-ceramic product will exhibit moduli of rupture over the interval of 10,000–20,000 psi. Although the latter values represent a significant improvement, numerous investigations have been undertaken to enhance the mechanical strength of glass-ceramic bodies.

Major research efforts in strengthening glass-ceramic bodies have, however, been concentrated in the area of developing compressive stresses within a surface layer on a body. Two such methods of enhancing strength have found commercial application. One has involved applying, or forming, a surface layer of different chemical or crystalline composition, e.g., a glaze, having a coefficient of thermal expansion lower than that of the body. A second has comprehended subjecting the body to chemical strengthening via an ion exchange reaction. Both of those techniques are effective in increasing the mechanical strength of glass-ceramic articles, but both also have practical disadvantages.

Compression strengthening requires the body to be subjected to a further process which adds cost to the product. More importantly, however, the procedure does not enhance the toughness of an article. Toughness imparts resistance to catastrophic failure even when impact damage does occur. Absent such resistance, internal tension causes a body to fragment explosively into a larger number of small pieces. This phenomenon is especially significant when the product is designed for consumer goods where it is desired that any breakage be of a "gentle" nature with a resultant few large pieces.

In contrast, efforts to develop glass-ceramics having improved intrinsic, that is "body", strength have been modest. Also, little attention has been given to developing inherently tough materials by controlling the crystallization pattern or structure.

The present invention evolved out of a continuing search for tough glass-ceramic materials having high intrinsic strength. The benefits of such an inherently strong body, as compared to a compression strengthened body, are apparent. Violent or explosive breakage, associated with the large stress concentrations in compression strengthened ware, is avoided. The body is relatively insensitive to surface flaws, such as surface crazing or impact bruises. The tendency of minor surface cracks to grow under stress, the source of delayed breakage, is avoided.

It had been observed that glass-ceramics based on two-dimensional or platy crystals appeared to be stronger than those based on framework or three-dimensional crystals, other factors, such as grain size and percent crystallinity, being equal. It followed then that a one-dimensional crystal, such as the chain-silicates, might be a fertile area to explore if developed with considerable anisotropy as acicular forms.

An initial consideration was ability to develop a glass from which the crystal might form. Unfortunately, most compositions suggested by the desired chain silicate crystal forms failed to melt, formed very fluid glasses, were otherwise difficult to handle, devitrified uncontrollably, or resisted internal nucleation.

One family that showed promise, the canasite family, is disclosed in a copending application, Ser. No. 308,143 filed Oct. 5, 1981 by G. H. Beall, now U.S. Pat. No. 4,386,162. Also disclosed are related synthetic crystal forms, agrellite and fedorite. The canasite crystal structure is there described as a multiple chain silicate exhibiting an anisotropic, blade-like crystal habit. Structurally, the crystals are composed of parallel silicate chains crosslinked to make a long, box-like backbone in which the potassium ions rest. These complex chain units are crosslinked into groups of four, and are separated by networks composed primarily of $Na(O,F)_6$ and $Ca(O,F)_6$ octahedra. Some articles wherein canasite comprises essentially the sole crystal phase have displayed moduli of rupture in excess of 50,000 psi. The interlocking, blade-like morphology of the crystals is assumed to account for the high strength of the final product.

Agrellite and fedorite are also anisotropic silicates. Little is known of the structure of fedorite, although it evidences some similarity to the micaceous silicates. Agrellite is a tubular chain silicate of acicular habit. Because these crystals do not demonstrate as extensive an interlocking morphology as canasite, the mechanical strength of articles, wherein essentially the sole crystal phase is agrellite and/or fedorite, does not normally exceed about 25,000 psi.

The canasite glass-ceramics have a number of desirable features with respect to molded products such as dinnerware. In particular, they exhibit an intrinsic strength and toughness that reduces the possibility of either catastrophic or explosive breakage.

The canasite glass-ceramics are handicapped, however, by a general tendency to sag and deform during the ceramming cycle. This necessitates use of special supports and controlled firing conditions to avoid deformed ware. Furthermore, the high thermal coefficient of expansion, as well as the need for formers, militate against combining glazing and ceramming, a combination that can be most important cost-wise.

PURPOSES OF THE INVENTION

A basic purpose is to provide a novel glass-ceramic material and a method of producing that material.

A particular purpose is to provide a tough glass-ceramic material having substantial intrinsic strength.

A specific purpose is to provide a glass-ceramic material having an intrinsic strength on the order of 20,000 psi or greater.

A practical purpose is to provide a glass-ceramic material wherein the raw materials are inexpensive, and melting and ceramming temperatures are not unduly high.

Another purpose is to provide a glass-ceramic material that does not require a separate strengthening treatment.

Another purpose is to provide a glass-ceramic material that minimizes the problems of delayed breakage and catastrophic or explosive breakage.

Another purpose is to provide a glass-ceramic material having a chain silicate crystal phase and a coefficient of expansion below about $100 \times 10^{-7}/°C$.

A further purpose is to provide a glass-ceramic material that resists sagging and deformation, thereby avoiding need for formers, during the ceramming stage.

Another purpose is to provide a glass-ceramic adapted to dinnerware production.

A further purpose is to provide a glazed, glass-ceramic body wherein the glaze is fired and the glass cerammed in one firing step.

SUMMARY OF THE INVENTION

The instant invention is directed to the production of tough glass-ceramic articles which, as formed, can exhibit moduli of rupture on the order of 20,000 psi and greater. The inventive articles have compositions consisting essentially, expressed in weight percent on the oxide basis, of:

$SiO_2$: 50-70
CaO: 4-15
MgO: 8-25
F: 3-8
$Na_2O$: 2-9
$K_2O$: 2-12
$Li_2O$: 0-3
$Al_2O_3$: 0-7

In the most general terms, the inventive products are prepared via a three-step method:

First, a batch of a predetermined composition is melted;

Second, the melt is simultaneously cooled to a temperature at least below the transformation range and a glass article of a desired configuration shaped therefrom; and then Third, the glass article is exposed to a temperature within the range of about 500°-1000° C. for a period of time sufficient to cause the growth of crystals in situ.

The predominant crystal phase in the present glass-ceramics is potassium fluorrichterite (KNaCaMg$_5$Si$_8$O$_{22}$F$_2$) alone or in conjunction with potassium canasite (K$_3$Na$_3$Ca$_5$Si$_{12}$O$_{30}$F$_4$).

In a preferred form, the crystal phase is essentially only potassium fluorrichterite, and the calculated composition of the precursor glass is, $SiO_2$: 57-68
$Al_2O_3$: 0-4
CaO: 0-3
$CaF_2$: 7-12
$Na_2O$: 2.5-5
$K_2O$: 3-7
MgO: 14-18

PRIOR LITERATURE

Amphiboles are known as the most common source of natural, multiple chain silicates.

Grossman, in U.S. Pat. No. 3,839,056, discloses a family of glasses in the composition system (Li,Na)$_2$O—(Ca,Mg)O—(B,Al)$_2$O$_3$—SiO$_2$—F which can be crystallized in situ to form glass-ceramics containing a significant fraction of fluoramphibole crystals.

The same inventor, in U.S. Pat. No. 3,905,824 discloses glass-ceramic articles consisting of fluor-mica or fluor-amphilbole crystals dispersed in a glassy matrix.

U.S. Pat. No. 2,948,629 (H. R. Shell) discloses synthetic fluoramphiboles in the form of fine, interlocking, acicular crystals which may be prepared by rapidly cooling a melt, or by sintering followed by hot pressing.

U.S. Pat. No. 3,516,810 (K. H. Ivey et al.) discloses a method of synthesizing minerals, including fluoramphiboles, which comprises forming a raw material batch corresponding in stoichiometry to the mineral, forming a glass batch, mixing the two, and heating to a temperature below the glass melting temperature. Boron compounds are avoided.

The following U.S. Patents discuss glass-ceramic materials proposed for dinnerware production:
No. 3,201,266
No. 3,384,508
No. 3,720,526
No. 4,341,872

Copending application, Ser. No. 308,143 filed Oct. 5, 1981 by G. H. Beall, describes a family of glass-ceramics having a predominant canasite crystal phase. This is a mixed alkali and alkaline earth fluosilicate crystal whose structure is based on polymeric chain silicates, and has been referred to earlier.

An article by J. S. Huebner and J. J. Papike, "Synthesis and Crystal Chemistry of Sodium-Potassium Richterite (Na,K)NaCaMg$_5$Si$_8$O$_{22}$(OH,F)$_2$: A model for Amphiboles", *American Mineralogist*, 55, 1973-1992 (1970), describes, inter alia, synthesis of richterites in which the A-site of the general amphibole structure contains potassium.

The subject of amphiboles is considered in great detal in "Amphiboles and Other Hydrous Pyriboles Mineralogy" D. R. Veblen, Ed., Volume 9A, *Reviews in Mineralogy*, published by Mineralogical Society of America (1982).

GENERAL DESCRIPTION OF THE INVENTION

The general formula for an amphibole-type crystal is expressed as,

$A_{0-1}B_2C_5T_8O_{22}(OH,F)_2$ wherein
A=Na,K; B=Na,Li,Ca,Mn,Fe$^{2+}$,Mg;
C=Mg,Fe$^{2+}$,Mn,Al,Fe$^{3+}$,Ti;
T=Si,Al Richterite, then, is in the class of sodic-calcic amphiboles with the formula, given as the sodium form,

NaCaNaMg$_5$Si$_8$O$_{22}$(OH)$_2$.

"Potassian" has been noted as an adjectival modifier with K being listed at 0.25-0.49 = ~1.3 to 2.7% $K_2O$, the general potassium fluorrichterite formula being,

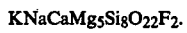

$KNaCaMg_5Si_8O_{22}F_2$.

The present invention arises from a search made for an intrinsically strong, tough glass-ceramic based on mixed alkali and alkaline earth fluosilicate crystals. The habit of such crystals is strongly anisotropic and predominantly unidimensional. Their structure is based on polymeric chain silicates in which double or higher order multiple chains form the mineral backbone.

Glass-ceramics characterized by a canasite crystal phase, as heretofore disclosed, and the present potassium fluorrichterite type bear similarities in that the crystals are multiple chain, silicate type formed from mixed alkali metal and alkaline earth metal fluosilicate glasses. Both provide tough materials of relatively high intrinsic strength. Further, as shown later, the two phases are compatible in a material, although it may be preferable to essentially exclude the canasite.

In spite of the similarities, there are distinct differences in composition which create very different characteristics in the two materials. Of particular interest is the sharp distinction in the fluidity of the residual glass during crystallization.

The present invention is based on our discovery that replacing a substantial proportion of the lime (CaO) content with magnesia (MgO) in canasite-type compositions results in formation of a second chain silicate phase. This is potassium fluorrichterite, $KNaCaMg_5Si_8O_{22}F_2$. It was further found that a series of highly crystalline materials could be formulated and produced which had compositions extending along the join with potassium canasite.

A glass having the stoichiometry of potassium fluorrichterite showed a remarkable cobweb fracture pattern forming fragments less than 1.4" when crystallized to a glass-ceramic. This behavior, previously observed in certain lithium aluminosilicate glass-ceramics, is generally associated with very rapid crystallization at high glass viscosity, a condition that prevails in the absence of residual glass. Thus, nucleation begins at an edge of a sample where a critical temperature is first reached, and proceeds along an exothermic wave radiating from the original crystallization center. The cracks reflect the relaxation of densification stresses which viscous flow could not alleviate. Presumably, this is due to high viscosity of the crystalline glass coupled with a high degree of crystallization which may be almost complete.

An effort then was made to find a composition along the canasite-richterite join that would combine the desirable features of each end member, that is, the high intrinsic strength of canasite and resistance to deformation of the potassium fluorrichterite. The best compositions for low distortion and no cracking were found in the potassium richterite side of the join near 70% potassium richterite and 30% canasite. While these do not exhibit the highest intrinsic strengths that can be demonstrated by canasite, they may, in optimum circumstances, display modulus of rupture values averaging better than 30,000 psi, and are unqualifiedly an improvement over previously known, amphibole glass-ceramics.

Compositions on the potassium fluorrichterite side of the canasite-potassium fluorrichterite join show less deformation during crystallization because the interval between fluoride nucleation and silicate crystallization is shorter. Thus, metastable silicate crystals begin to form just above 600° C. in these potassium fluorrichterite compositions, whereas, in canasite dominated compositions, the canasite does not form until over 700° C. Further, empirical estimates of relative fluidity of residual glass during crystallization shows values of 3 to 15 for the fluorrichterite compositions as compared to 20-50 for the predominantly canasite compositions.

Glass-ceramic compositions containing potassium fluorrichterite as the major crystalline phase, with canasite as an optional secondary phase, and having a uniform and mechanically tough microstructure of elongated, randomly-oriented crystallites can be developed with very low distortion of the original glass shape within the following composition ranges, based on calculated compositions in weight percent as calculated from the batches:

$SiO_2$: 50-70
MgO: 8-25
CaO: 4-15
$Na_2O$: 2-9
$K_2O$: 2-12
$Li_2O$: 0-3
$Al_2O_3$: 0-7
F: 3-8

Up to about 5 mole percent of other oxides such as BaO, SrO, $B_2O_3$ and the various glass colorants may be included if desired for specific effect. In general, it will be observed that these composition ranges do not greatly differ from those defined in the Beall application for canasite-type glass-ceramics. The major difference is the substantial reduction in lime and introduction, as a substituent, of MgO.

The net effect has been to reduce deformation during the ceramming cycle. For example, 6" bars ¼" thick were mounted on supports spaced 5" apart. They were observed to sag less than ½", and on some occasions less than ¼", during the ceramming cycle.

The K-fluorrichterite compositions have certain characteristic features. Thus the A-site in the typical crystal structure contains substantial potassium ($K^+$), whereas prior studies have centered on soda compositions, or compositions with much lower $K_2O$ contents. The C-site is characteristically occupied by $Mg^{+2}$. Also, whereas prior richterites, either natural or synthetic, have been primarily hydroxy richterites, the present materials are fluorrichterites.

Further studies have indicated that maximum reduction in glass fluidity during ceramming, and consequent resistance to sagging, is attained in materials characterized by a single crystal phase, K-fluorrichterite. As indicated earlier, the pure stoichiometric glass fragments during ceramming. Accordingly, it is necessary to provide a residual glass phase, and to carefully control the composition of that phase.

Accordingly, our preferred compositions, as calculated on the oxide basis, fall within the following ranges, $SiO_2$: 57-68
$Al_2O_3$: 0-4
CaO: 0-3
$CaF_2$: 7-12
$Na_2O$: 2.5-5
$K_2O$: 3-7
MgO: 14-18
BaO: 0-1

In formulating glasses for use in accordance with the present invention, care must be taken to observe composition limits quite carefully.

It is generally desirable to employ as high a content of silica as possible in order to minimize fluidity in the glass. However, as $SiO_2$ is increased, there is a strong tendency to develop cristobalite crystals during the crystallization stage. It has been found that minor additions of alumina ($Al_2O_3$) and/or baria (BaO) tend to counteract this tendency somewhat.

The substitution of magnesia (MgO) for the characteristic lime (CaO) of the canasite compositions is a key feature of the invention. However, glasses with high MgO contents tend to be very fluid. Hence, MgO must be limited to no more than about 18%.

The potassia ($K_2O$) content is also critical. As shown later this can be reduced to about 2%, but a minimum of 3% is preferred. Further reduction, coupled with soda ($Na_2O$) substitution, results in severe sagging during the ceramming step. Hence, the amount present is desirably limited.

Calcium fluoride is the nucleating agent and is shown as the fluoride. Approximately 10% fluorine loss is usually encountered in melting. The crystal phase in these preferred materials is essentially K-fluorrichterite.

In keeping with glass-ceramic practice, the compositions are first formulated, batched, and melted as glasses. Advantageously, batches can be mixed from inexpensive, readily available raw materials such as sand, soda ash, potash, fluorspar, and magnesia.

The batches generally melt at 1300°–1400° C. and produce clear glasses. although a degree of opalescence may occur in some cases. The molten glass may be cast, pressed, or spun to desired shapes, such as bowls, plates and cups for dinnerware.

The glass articles thus formed may then be converted by in situ crystallization to the glass-ceramic state. This may be accomplished in a one step operation wherein the glass is heated at a controlled rate through at least a substantial portion of the temperature range of 500°–1000° C.

In the present instance, as is usually true in ceramming practice, it is preferable to separate heat treatment into two stages or steps, an initial hold in the lower portion of the range to effect nucleation and the start of crystal deposition, followed by heating to a higher temperature and holding for crystal formation on the nuclei. It has frequently been observed that crystallization will be more uniform and fine-grained if the heat treatment of the glass article is undertaken in two stages. Moreover, subjecting the glass article to a nucleation treatment inhibits the possibility of the thermal deformation thereof as the temperature approaches and, perhaps, exceeds the softening point of the glass. Thus, prior nucleation leads to more rapid subsequent growth of crystals. These crystals are more refractory than the glass and thereby act to render the article dimensionally stable to thermal deformation.

Consequently, the glass article will initially be heated to about 500°–650° C. to develop nuclei and initiate the generation of crystals therein. The temperature will then be raised to effect the growth of crystals on the nuclei. With the present compositions, fluorite ($CaF_2$), or $CaF_2$-rich amorphous droplets, constitutes the nucleating phase which separates out of the glass. As is well known, crystallization proceeds more rapidly as the temperature is increased. Accordingly, exposures of no more than about 0.25 hour may be necessary at 900°–1000° C., whereas up to 12 hours and more may be demanded to achieve a very highly crystalline article at 750° C. Where a two-step heat treatment is employed, nucleation for about 0.5–6 hours at 500°–650° C., followed by crystallization for about 0.5–8 hours at 750°–1000° C. has been found suitable to produce highly crystalline articles wherein the crystals are uniformly fine-grained. It has been found that optimum results are usually obtained with a hold of up to about one hour at 550°–600° C. for nucleation followed by crystallization for a period of about one to four hours at 1000° C. for crystallization.

During heat treatment in the range of 600°–800° C., metastable phases, particularly tetrasilicic fluormica, $(K,Na)Mg_{2.5}Si_4O_{10}F_2$, and to a lesser extent, diopside ($CaMgSi_2O_6$), can form, but these react above 800° C. to form potassium fluorrichterite. Potassium fluorrichterite is generally the sole crystalline phase observed after ceramming. However, some diopside may be found on the surface where loss of fluoride may have occurred due to volatilization.

Abraded M.O.R. values on most of these compositions are in excess of 20,000 psi. The materials show excellent resistance to impact. One feature of particular importance to the manufacture of tableware has been demonstrated within this composition area: that is, the glass can be pressed into a complex shape like a cup, and subsequently this cup can be decorated (underglaze), glazed, and cerammed in a single thermal cycle without the use of formers. Surface compression can be developed during the ceram-glaze cycle because the thermal expansion of the glass-ceramic is relatively high, with a coefficient near $85 \times 10^{-7}$/°C. This surface compression does not produce frangible behavior if the article is broken, because of the high toughness of the material. This toughness also increases thermal shock resistance. For example, a glazed cup has been saw notched and then hot tea has been poured into the cup while it was immersed in ice water. Failure did not occur.

SPECIFIC DESCRIPTION

Table I records a number of glass compositions, expressed in terms of parts by weight on the oxide basis, illustrating the parameters of the instant invention. Inasmuch as it is not known with which cation(s) the fluoride is combined, it is reported either separately as $F_2$, or as $CaF_2$, the batch constituent by which it was incorporated into the glass. Moreover, because the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

The exemplary glasses recorded in Table I were produced in the following manner. The batch materials were compounded, ballmilled together to assist in securing a homogeneous melt, deposited into platinum crucibles, lids placed upon the crucibles, and the crucibles introduced into a furnace operating at 1250°–1450° C. After about four hours, the crucibles were removed from the furnace, cane having a diameter of about 0.25" drawn therefrom and the remainder of the melts poured into steel molds to yield rectangular glass slabs having the dimensions of about 6"×6"×0.5" and the slabs immediately transferred to an annealer operating at about 500° C.

Loss of fluoride through volatilization during melting averaged about 5-10% by weight.

Losses during melting, except for fluorine which was about 10%, were relatively small as may be seen from the following calculated and analyzed compositions for a melt of Glass 10. Ingredients such as $Al_2O_3$ may un-

TABLE I

|  | 1 | 2 | 3 | 4 | 5 | 6 | 7 | 8 | 9 |
|---|---|---|---|---|---|---|---|---|---|
| $SiO_2$ | 56.5 | 58.0 | 58.0 | 58.5 | 57.0 | 65.0 | 60.0 | 60.0 | 65.0 |
| $Al_2O_3$ | — | 2.0 | 2.0 | 2.0 | 2.0 | — | 2.0 | 4.0 | 2.0 |
| MgO | 11.8 | 16.0 | 18.0 | 18.5 | 22.0 | 10.0 | 17.0 | 16.0 | 15.0 |
| CaO | 14.1 | 9.7 | 7.7 | 7.7 | 6.3 | 9.7 | 7.7 | 7.7 | 6.3 |
| $Li_2O$ | — | — | — | — | — | — | — | 1.0 | 1.0 |
| $Na_2O$ | 5.4 | 4.0 | 4.0 | 4.0 | 4.0 | 8.0 | 3.5 | 3.5 | 3.0 |
| $K_2O$ | 8.7 | 7.0 | 7.0 | 6.0 | 6.0 | 4.0 | 6.5 | 4.5 | 5.0 |
| F | 5.5 | 5.2 | 5.2 | 5.2 | 4.2 | 5.2 | 5.2 | 5.2 | 4.2 |
| Glass | Clear | Clear | Clear | Clear | Clear | Clear | Clear | Hazy opal | Clear |
| Ceram Schedule (°C. hrs.) | 560-4 850-4 | 700-1, 900-1, 850-1 | 950-½ | 575-2 950-4 | 950-1 | 900-1 | 600-1 950-1 | 580-1 950-4 | 600-1 950-1 |
| Phase | K—richterite, canasite | K—richterite | K—richterite | K—richterite | K—richterite | K—richterite | K—richterite | K—richterite | K—richterite |
| M.O.R. Ksi | — | — | 25.0 | 32.0 | — | — | 24.0 | — | 23-25 |

In addition to the precursor glass composition, TABLE I also shows the appearance of the glass after melting and cooling, the ceramming schedule employed in degrees C. and hours, and the crystal phase(s) observed. Finally, where MOR was measured, the average value is presented in Ksi. Before MOR measurements were made, the samples were first abraded by tumbling with 30 grit SiC. MOR measurements were made in conventional manner by center loading 5/16" bars (after abrasion) resting of knife edge supports spaced 3" apart. Certain ceram schedules show a first temperature at which the glass was held for nucleation, and a second temperature employed for crystallization. Examples 1 and 2 illustrate an 850° C. hold to permit crystallization of canasite.

TABLE II sets forth, in the same manner as TABLE I, compositions within the preferred range wherein essentially a single crystal phase, K-fluorrichterite is obtained. In these compositions, residual glass is controlled to limit fluidity both in the precursor glass during ware forming and in the residual glass during ceramming.

TABLE II

|  | 10 | 11 | 12 | 13 |
|---|---|---|---|---|
| $SiO_2$ | 59 | 62.0 | 65 | 65 |
| $Al_2O_3$ | 2 | 2.0 | 2 | 2 |
| MgO | 18 | 16.5 | 16 | 14½ |
| $CaF_2$ | 11 | 10.0 | 8 | 9 |
| $Na_2O$ | 3 | 3.5 | 3 | 4 |
| $K_2O$ | 7 | 5.5 | 4 | 3½ |
| $Li_2O$ | — | 0.5 | 1 | 1 |
| BaO | — | — | 1 | 1 |

A small tank melt of each glass was made and ware pressed from the glass. Typical raw materials, such as fluorspar, alumina, soda ash and sand were employed and glasses were melted at 1300°-1400° C.

Viscosity curves were obtained for the glasses. It was noted that the viscosity of Glass 11 at a comparable temperature (about 1200° C.) was about 500 poises as compared to 200 poises for Glass 10. Glass 12 in turn has a value approaching 1000 poises. The increases parallel increased $SiO_2$ contents, as well as MgO and $K_2O$ control. Increase in viscosity near the liquidus is important because it determines whether special glass forming apparatus must be used to accommodate glass fluidity.

dergo a slight increase due to refractory corrosion during melting.

|  | Calculated | Analyzed |
|---|---|---|
| $SiO_2$ | 58.09 | 56.87 |
| CaO | 7.78 | 7.64 |
| $K_2O$ | 7.17 | 7.23 |
| $Al_2O_3$ | 1.97 | 2.37 |
| $Na_2O$ | 2.87 | 3.05 |
| F | 6.58 | 5.11 |
| MgO | 18.25 | 17.66 |
| $Fe_2O_3$ | .06 | .06 |

Thermal expansion coefficient measurements were made on the glasses. Glass 10 had a value of $90 \times 10^{-7}/°C$. in the temperature range 25°-300° C. which increased to $102 \times 10^{-7}/°C$. in the 25°-700° C. range. Glass 11 showed values of 89 and 100 respectively. These values are important for various reasons, but especially relative to heat shock resistance and glaze compatibility.

A very significant observation, from an economic standpoint, was that a molded glass cup could be glazed and then subjected to a heat treatment that simultaneously fired the glaze and cerammed the glass. The following schedule was employed:
  Heat at furnace rate to 610° C.
  Heat at 200° C./hr to 950° C.
  Hold 30-60 min, at 950° C.
  Cool at furnace rate.

It may be noted that Glass 11 showed an empirical value of 4.9 for relative fluidity during ceramming. By comparison, canasite compositions commonly are estimated in a range of 20-50.

By way of illustrating the criticality of the potassium content in the present materials, a series of compositions were formulated based on Example 12 of TABLE II. This base composition was then reformulated by exchanging $Na_2O$ for $K_2O$ at 0.5% increments between 4 and 0% $K_2O$ and, conversely, 3 and 7% $Na_2O$.

Glass batches corresponding to these compositions were mixed and melted. The melts were cast in flat sheets or patties which were cut into bars 6"×¾"×¼". The glass bars thus produced were placed on ceramic supports spaced 5" apart and introduced into a ceramming furnace. The depth of sagging was measured on each cerammed bar and is shown below in sixteeenths of an inch. Each sample is identified by the percentages of K₂O and Na₂O in the composition.

| Sample | 1 | 2 | 3 | 4 | 5 | 6 | 7 | 8 | 9 |
|---|---|---|---|---|---|---|---|---|---|
| % Na₂O | 3.0 | 3.5 | 4.0 | 4.5 | 5.0 | 5.5 | 6.0 | 6.5 | 7.0 |
| % K₂O | 4.0 | 3.5 | 3.0 | 2.5 | 2.0 | 1.5 | 1.0 | 0.5 | 0.0 |
| Sag (1/16") | 6 | 6 | 7 | 8 | 9 | 13 | 19 | 19 | 19 |

It is apparent that deformation tendencies grow as K₂O is decreased below about 3%, and become disastrous below about 2%. It may also be noted that the crystal phase in samples 1 and 2 was essentially K-fluorrichterite, whereas increasing amounts of cristobalite were noted in the remainder. Also, the first two had a ringing sound when struck, whereas the remainder had a dull sound indicative of a microcracked structure.

DESCRIPTION OF THE DRAWING

The single FIGURE in the drawing is a graphical showing of a differential thermal analysis curve for the glass of Example 10. While specific to that glass, it is typical of glasses within the present inventive scope. In the FIGURE, temperature is plotted along the horizontal axis in °C. Activity level, as evidenced by thermal activity and shown by ΔT, is plotted along the vertical axis.

The graphical illustration shows two major exothermic peaks occurring in the temperature interval of 650°-800° C. as the glass is heated from the nucleating temperature of 560° C. to the full crystallization temperature of 980° C. where an endothermic valley is observed.

It is our belief that the two exothermic peaks represent temperatures at which some change in crystal phase, or a chemical reaction, occurs. Specifically we believe that a metastable fluormica phase, e.g., $(K,Na)Mg_{2.5}Si_4O_{10}F_2$ forms at the first peak, sometimes associated with diopside, $CaMgSi_2O_6$. This could explain the excellent non-sagging character on the basis that the flux oxides that normally contribute fluidity are tied up, at least in substantial degree, in a crystal. Subsequently, we believe these crystals react with each other and with the residual glass to form the final potassium fluorrichterite.

There is good reason to believe a further intermediate phase, diopside, is formed either with the mica, or at least before the final crystal phase emerges. However, that has not been studied as yet. While we do not wish to be bound by these theories, we do feel they represent a potential explanation of the invention.

We claim:

1. A highly crystalline glass-ceramic article exhibiting high toughness and a modulus of rupture in excess of 20,000 psi, wherein the predominant crystal phase is potassium fluorrichterite and having an overall composition consisting essentially, expressed in terms of weight percent on the oxide basis, of about $SiO_2$: 50-70
CaO: 4-15
MgO: 8-25
F: 3-8
$Na_2O$: 2-9
$K_2O$: 2-12
$Li_2O$: 0-3
$Al_2O_3$: 0-7.

2. A glass-ceramic article in accordance with claim 1 wherein canasite is a secondary crystal phase.

3. A glass-ceramic article in accordance with claim 2 wherein the ratio of potassium fluorrichterite crystals to canasite crystals is about 7:3.

4. A glass-ceramic article in accordance with claim 1 wherein potassium fluorrichterite essentially constitutes the crystal phase and the calculated composition, expressed in terms of percent by weight on the oxide basis, is $SiO_2$: 57-68
$Al_2O_3$: 0-4
CaO: 0-3
$CaF_2$: 7-12.
$Na_2O$: 2.5-5
$K_2O$: 3-7
MgO: 14-18

5. A glass-ceramic article in accordance with claim 4 wherein the SiO₂ content is at least 62%.

6. A glass-ceramic article in accordance with claim 4 wherein the composition further includes up to about one percent each of BaO and Li₂O.

7. A glass-ceramic article in accordance with claim 4 wherein the calculated composition is essentially SiO2, 65%; Al₂O₃, 2%; MgO, 14½%; CaF₂, 9%; Na₂O, 4%; K₂O, 3½%; Li₂O, 1%; BaO, 1%.

* * * * *